(12) United States Patent
Katakami et al.

(10) Patent No.: US 9,647,514 B2
(45) Date of Patent: May 9, 2017

(54) MOTOR CONTROL UNIT HAVING INTEGRATED INVERTER UNIT

(71) Applicant: NISSAN MOTOR CO., LTD., Kanagawa (JP)

(72) Inventors: Akihiro Katakami, Fujisawa (JP); Tomoki Kawamura, Zama (JP); Hirofumi Shimizu, Atsugi (JP); Hiroaki Takahashi, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 276 days.

(21) Appl. No.: 14/376,980

(22) PCT Filed: Feb. 4, 2013

(86) PCT No.: PCT/JP2013/052456
§ 371 (c)(1),
(2) Date: Aug. 6, 2014

(87) PCT Pub. No.: WO2013/118674
PCT Pub. Date: Aug. 15, 2013

(65) Prior Publication Data
US 2015/0008804 A1    Jan. 8, 2015

(30) Foreign Application Priority Data

Feb. 9, 2012 (JP) .................................. 2012-026013

(51) Int. Cl.
*H02K 11/00* (2016.01)
*H02K 5/22* (2006.01)
*H02K 5/24* (2006.01)
*H02K 11/33* (2016.01)

(52) U.S. Cl.
CPC ......... *H02K 11/0073* (2013.01); *H02K 5/225* (2013.01); *H02K 5/24* (2013.01); *H02K 11/33* (2016.01)

(58) Field of Classification Search
CPC .... H02K 11/0073; H02K 11/33; H02K 5/225; H02K 5/24
USPC .................................. 310/68 D, 71
See application file for complete search history.

(56) References Cited

U.S. PATENT DOCUMENTS

2003/0200761 A1* 10/2003 Funahashi ............ H02K 11/33
                                                              62/228.4
2004/0066111 A1*  4/2004 Torii ..................... H02K 5/148
                                                              310/71

FOREIGN PATENT DOCUMENTS

| JP | 2002165412 A | 6/2002 |
| JP | 2003324903 A | 11/2003 |
| JP | 2004215355 A | 7/2004 |
| JP | 2007282309 A | 10/2007 |

* cited by examiner

*Primary Examiner* — Michael Andrews
(74) *Attorney, Agent, or Firm* — Young Basile Hanlon & MacFarlane, P.C.

(57) ABSTRACT

A motor control unit is obtained by integrating an inverter unit and a motor unit having a motor, the inverter unit having a control board erected on a support board.

8 Claims, 4 Drawing Sheets

MOTOR CONTROL UNIT HAVING INTEGRATED INVERTER UNIT

CROSS REFERENCE TO RELATED APPLICATION

The present application claims priority to Japanese Patent Application No. 2012-026013, filed Feb. 9, 2012, incorporated herein in its entirety.

TECHNICAL FIELD

The present invention relates to a motor control unit.

BACKGROUND ART

In the related art, a technique of using a vibration-damping support means for fixing a control board of a control unit that controls a driving apparatus is discussed in JP 2004-215355 A.

SUMMARY OF INVENTION

In the technique discussed in the aforementioned document, the control board is arranged in a stacking manner along with other components such as a capacitor and a motor. Therefore, disadvantageously, the length of the control unit increases in the stacking direction, and a size of the control unit increases.

In view of the aforementioned problems, there is a need for miniaturization of the control unit by shortening the length in the stacking direction.

According to an aspect of the invention, there is provided a motor control unit obtained by integrating an inverter unit and a motor unit having a motor, the inverter unit having a control board erected on a support board.

Embodiments of the present invention and advantages thereof are described in detail below with reference to the accompanying drawings.

DESCRIPTION OF EMBODIMENTS

Figure 1:
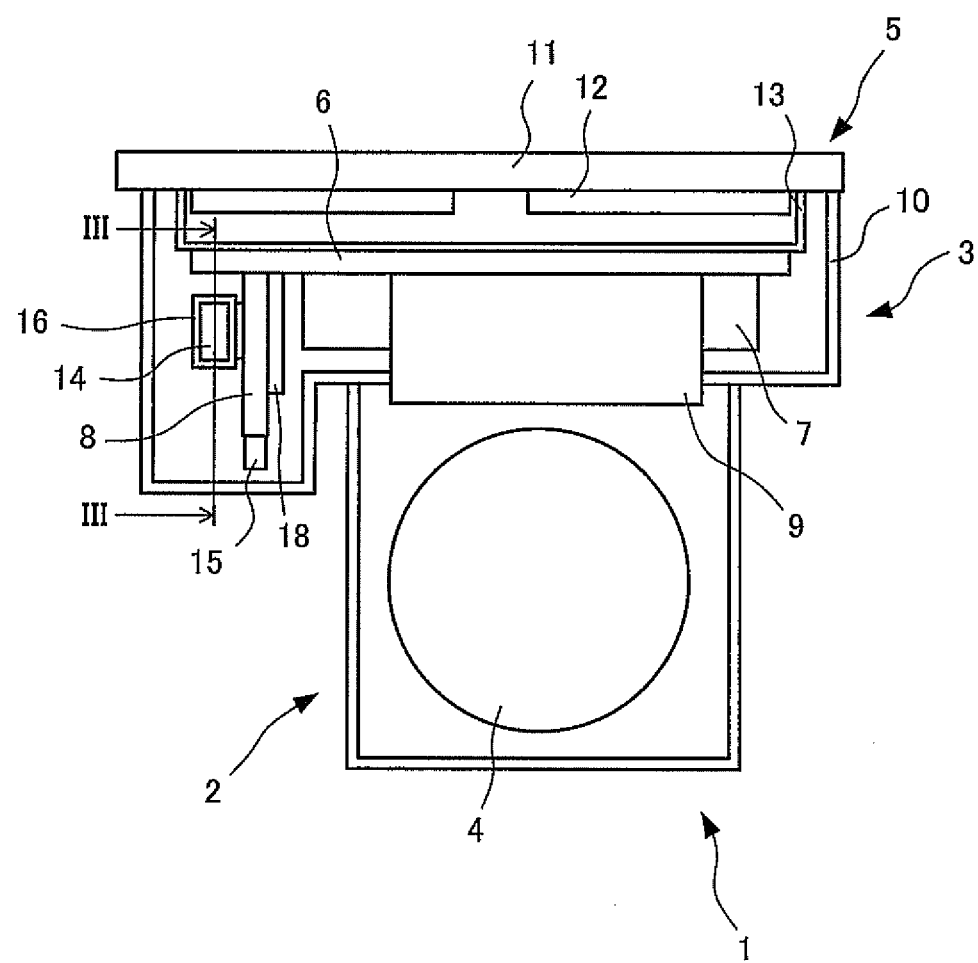
FIG. 1 is a schematic cross-sectional view illustrating a motor control unit according to a first embodiment.

A description will now be made for a motor control unit according to a first embodiment. FIG. 1 is a schematic cross-sectional view illustrating the motor control unit.

The motor control unit 1 includes a motor unit 2 having a motor 4 and an inverter unit 3.

The inverter unit 3 includes a power module unit 5, a support board 6, a smoothing capacitor 7, a control board 8, a busbar 9, a first casing 10, a first connector unit 14, and a second connector unit 15.

The power module unit 5 includes a power module 12 formed of a semiconductor device such as a transistor and installed in a cooler 11 by interposing an insulator and a second casing 13 that houses the power module 12. A coolant such as air or a cooling water flows to the cooler 11 so that the power module 12 is cooled by the coolant.

Figure 2:
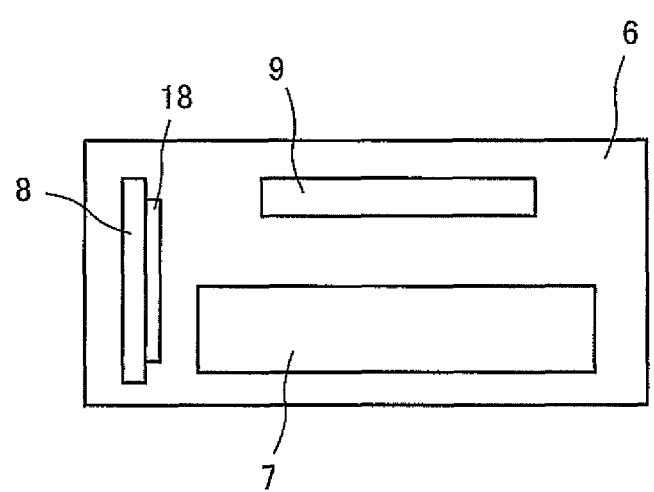
FIG. 2 is a diagram illustrating arrangement of a control board, a smoothing capacitor, and a busbar.

The support board 6 is a plate-shaped board and is installed in the outer surface of the second casing 13. The smoothing capacitor 7, the control board 8, the busbar 9, and the board mount portion 18 are installed in the support board 6. As the support board 6 is seen from the motor 4 side, the smoothing capacitor 7 and the busbar 9 are arranged in parallel, and the control board 8 is arranged to intersect with the smoothing capacitor 7 and the busbar 9 as illustrated in FIG. 2. That is, the smoothing capacitor 7, the control board 8, and the busbar 9 are arranged on the support board 6 in an approximately U-shape as seen from the motor 4 side. FIG. 2 illustrates only the support board 6, the control board 8, the busbar 9, and the smoothing capacitor 7. The support board 6 is provided with a circuit for controlling the power module 12 and the like.

The power module 12, the second casing 13, and the support board 6 are stacked on the cooler 11, and the motor unit 2 is provided along this stacking direction. That is, the support board 6 and the motor 4 are arranged along the stacking direction, and the juxtaposing direction of the support board 6 and the motor 4 matches the stacking direction.

The control board 8 is a plate-shaped board provided with a circuit for controlling the motor 4 and is fixed to the board mount portion 18 erected on the support board 6. Specifically, the control board 8 is arranged perpendicularly to the support board 6 in parallel with the board mount portion 18. It is noted that the control board 8 may be directly erected on the support board 6 without using the board mount portion 18.

The busbar 9 is used to connect the motor 4 and the power module 12.

Figure 3:
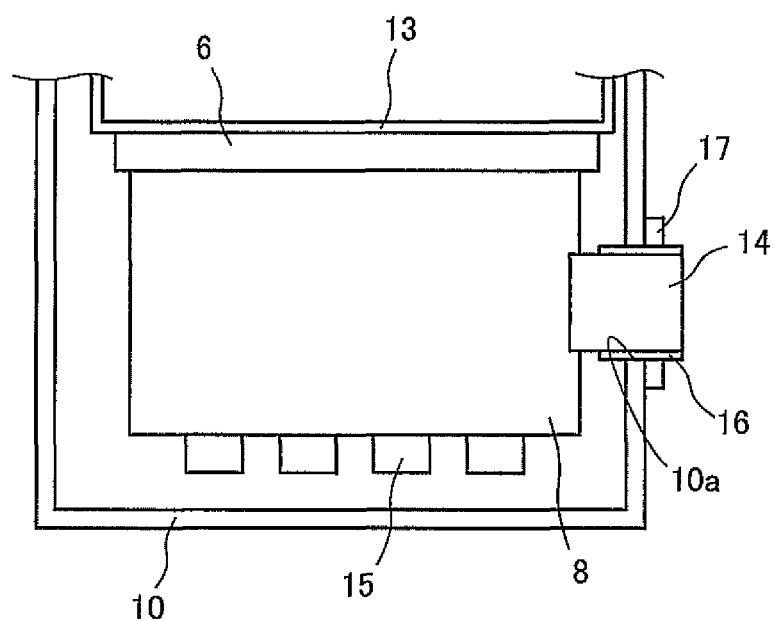
FIG. 3 is a schematic cross-sectional view taken along a line of FIG. 1.

A description will now be made for the first connector unit 14 with reference to FIG. 3. FIG. 3 is a schematic cross-sectional view taken along the line III-III of FIG. 1, in which a part of the elements are omitted intentionally for convenience purposes.

The first connector unit 14 is connected to the control board 8. The first connector unit 14 extends from the connecting portion in a plane direction of the control board 8, which intersects with a direction where the control board 8 is installed in the support board 6, while it penetrates a through-hole 10a of the first casing 10, and a part thereof is positioned in the outside of the first casing 10. Specifically, the first connector unit 14 is provided to extend in a plane direction of the control board 8 perpendicular to a direction where the control board 8 is installed in the support board 6. In addition, the first connector unit 14 is connected to a power source that supplies power to the control board 8. As a result, it is possible to supply power to the control board 8 through the first connector unit 14 from the outside of the first casing 10. Between the first connector unit 14 and the through-hole 10a of the first casing 10, a first resin portion 16 for damping vibration is provided so that the first connector unit 14 and the control board 8 are supported by the first casing 10 by interposing the first resin portion 16.

The first resin portion 16 is formed of a resin having an elastic damping characteristic in order to prevent vibration generated from the motor 4 and the like from being transmitted to the control board 8 through the first casing 10 and the first connector unit 14. The first resin portion 16 is fitted to a second resin portion 17 that damps vibration in the outside of the first casing 10.

The second resin portion 17 is formed of a resin having an elastic damping characteristic and is installed in the first casing 10 using a bolt, a nut, and the like. The first connector unit 14 and the control board 8 are supported by the first casing 10 by interposing the second resin portion 17. The second resin portion 17 prevents vibration generated from the motor 4 or the like from being transmitted to the control board 8 through the first casing 10 and the first connector unit 14. The first connector unit 14 and the control board 8 are supported by the first casing 10 by interposing the second resin portion 17.

The second connector unit 15 is provided in an end portion of the control board 8 opposite to the end portion supported by the support board 6 and is connected to the control board 8, the support board 6, and the like.

In this embodiment, the control board 8 is supported by the board mount portion 18 erected on the support board 6 and is also supported by the first casing 10 by interposing the first and second resin portions 16 and 17 in a direction intersecting with the stacking direction. That is, the control board 8 is supported from different directions.

A description will now be made for the effects of the first embodiment of the invention.

If the control board is arranged in a stacking manner between the support board and the motor and the like, the length of the motor control unit increases in the stacking direction.

In this embodiment, the control board 8 of the motor control unit 1 is supported by the board mount portion 18 erected on the support board 6. In the direction where the support board 6 and the motor 4 are arranged, it is necessary to provide a length matching with the size of the motor 4, and in this embodiment, a space corresponding to this length can be effectively used. For this reason, it is possible to shorten the length of the motor control unit 1 in the juxtaposing direction of the support board 6 and the motor 4, that is, in the stacking direction of the support board 6 and the like. Therefore, it is possible to miniaturize the motor control unit 1.

Since the control board 8 is supported by the first casing 10 using the first connector unit 14 that supplies power to the control board 8 from the outside, the control board 8 is supported in two directions. Therefore, it is possible to improve a support rigidity of the control board 8.

Since the first resin portion 16 capable of damping vibration is provided between the first connector unit 14 and the through-hole 10a of the first casing 10, it is possible to prevent vibration generated from the motor 4 or the like from being transmitted to the control board 8 through the first casing 10 and the first connector unit 14.

When the motor control unit 1 is mounted on a vehicle, for example, vibration input from a road surface during a travel or vibration generated from an engine in the case of a hybrid vehicle is also transmitted in addition to the vibration generated from the motor 4. For this reason, it is preferable that the vibration transmitted to the control board 8 be damped by increasing the support rigidity of the control board 8. Since the motor control unit 1 of this embodiment can damp vibration by increasing the support rigidity of the control board 8, it is possible to improve a vibration resistance of the control board 8.

Since the second connector unit 15 is provided in another end portion of the control board 8 opposite to the end portion where the support board 6 is installed, it is possible to easily perform wiring for the control board 8, the support board 6, and the like.

Figure 4:
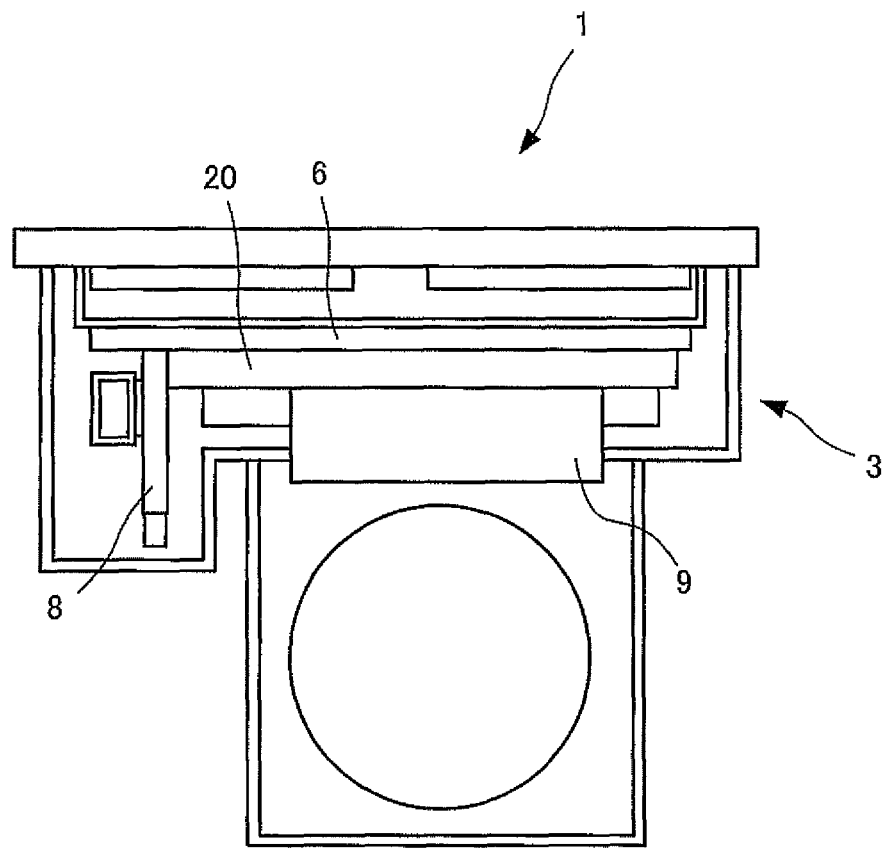
FIG. 4 is a schematic diagram illustrating a motor control unit according to a second embodiment.

Next, a description will be made for a second embodiment of the invention with reference to FIG. 4.

The description will focus on differences between the first and second embodiments.

In the inverter unit 3 of the motor control unit 1 according to this embodiment, the busbar 9 and the control board 8 are connected using the support portion 20.

The support portion 20 is erected on the support board 6. Specifically, the support portion 20 is arranged perpendicularly to the support board 6 and is installed in the support board 6, for example, using a bolt and a nut. The support portion 20 is arranged perpendicularly to the control board 8 and is installed in the end portion of the control board 8. As a result, the control board 8 is supported by the support board 6 using the support portion 20.

The support portion 20 is formed of a resin having an elastic damping characteristic. The support portion 20 covers a surface of the busbar 9 and is integrated into the support portion 20 and the busbar 9.

A description will now be made for the effects of the second embodiment of the invention.

Since the control board 8 is supported by the support board 6 using the support portion 20, it is possible to increase a support rigidity of the control board 8. In addition, since the support portion 20 is formed of a resin having an elastic damping characteristic, it is possible to prevent vibration generated from the motor 4 from being transmitted to the control board 8 through the support portion 20.

Although the embodiments of the present invention have been described above, the above embodiments are only an illustration of some application examples of the present invention and not intended to limit the technical scope of the present invention to the specific configurations of the above embodiments.

Although the first and second resin portions 16 and 17 are provided as a damping member, the invention is not limited thereto. For example, a member having an elastic damping characteristic such as rubber may be employed.

Although, in the aforementioned embodiment, the first connector unit 14 is provided in a direction intersecting with a direction where the control board 8 is installed in the support board 6, and the second connector unit 15 is provided in another end portion opposite to the end portion supported by the support board 6, the invention is not limited thereto. For example, the first and second connector units may be provided conversely.

The support portion 20 according to the second embodiment may be installed in the control board 8 in the vicinity of the center of the control board 8.

The invention claimed is:

1. A motor control unit having an integrated inverter unit and a motor unit with a motor, the integrated inverter unit comprising:
    a control board erected on a support board such that the control board extends in a plane perpendicular to a plane in which the support board extends;
    a casing that houses the support board and the control board; and
    a power supply unit spaced from the support board that penetrates a wall of the casing and connects a power source and the control board, the power supply unit directly supporting the control board erected on the support board.

2. The motor control unit according to claim 1, wherein the integrated inverter unit comprises a plate-shaped board mount portion erected on the support board, and
    the control board is installed in the plate-shaped board mount portion.

3. The motor control unit according to claim 1, wherein the integrated inverter unit comprises a damping portion that damps vibration between the power supply unit and the casing.

4. The motor control unit according to claim 1, wherein the control board is supported by a busbar.

5. The motor control unit according to claim 1, wherein the integrated inverter unit comprises a connector unit connected to another end portion of the control board different from an end portion supported by the support board.

6. The motor control unit according to claim 1, wherein the control board is erected along a juxtaposing direction of the support board and the motor.

7. The motor control unit of claim 1, the integrated inverter unit further comprising a board mount portion directly on the support board, the control board supported on the support board between the board mount portion and the power supply unit.

8. The motor control unit of claim 1, wherein the power supply unit is provided in a through-hole in the wall of the casing, the integrated inverter unit further comprising a dampener provided in the through-hole between the power supply unit and the wall of the casing.

* * * * *